April 7, 1942.　　F. H. GULLIKSEN　　2,278,516
VOLTAGE INDICATOR
Filed Sept. 7, 1939
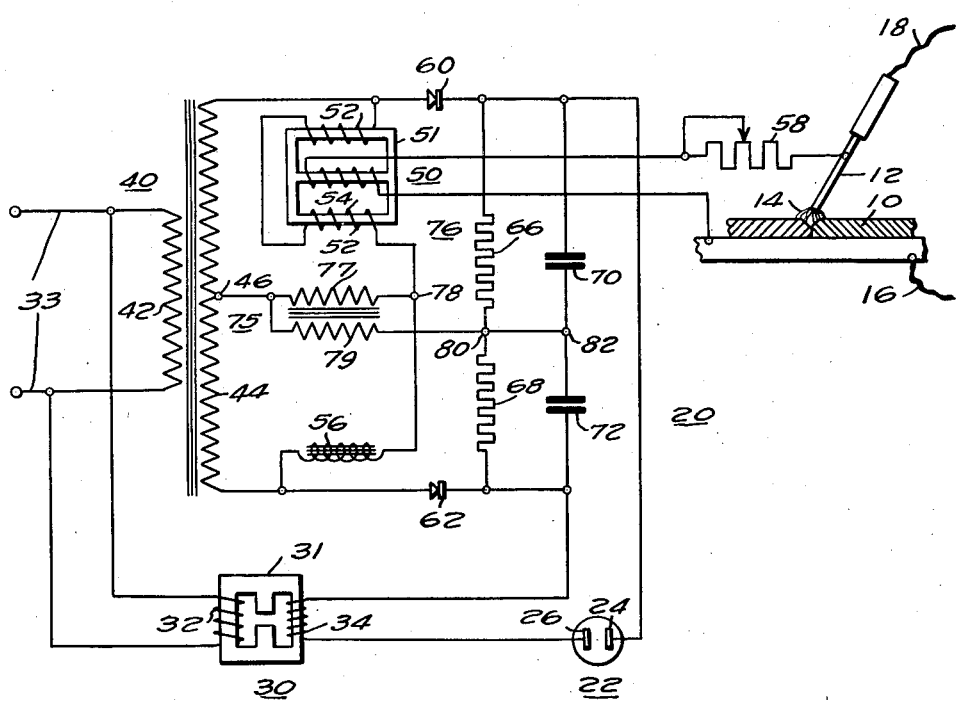
WITNESSES:
E. A. McCloskey
G. V. Giolma
INVENTOR
Finn H. Gulliksen.
BY
ATTORNEY

UNITED STATES PATENT OFFICE 2,278,516

VOLTAGE INDICATOR

Finn H. Gulliksen, Pittsburgh, Pa., assignor to Westinghouse Electric & Manufacturing Company, East Pittsburgh, Pa., a corporation of Pennsylvania Application September 7, 1939, Serial No. 293,729

6 Claims. (Cl. 177—311)

My invention relates generally to indicators, and it has reference, in particular, to a system or device for visually indicating generally the value of voltages relative to a predetermined normal value.

An object of my invention, generally stated, is to provide in a simple, inexpensive, and reliable manner for indicating voltage conditions in a circuit.

More specifically, it is an object of my invention to provide for visually indicating the relative value of a particular voltage with respect to a predetermined normal value.

Another object of the invention is to provide for operating a voltage indicator by applying a voltage thereto by means of an alternating current impedance circuit which is responsive to variations in the voltage of which an indication is desired.

A further object of the invention is to provide for controlling the operation of a relatively high voltage glow tube indicator so as to indicate relative voltage conditions in a relatively low voltage circuit.

A still further object of the invention is to provide a voltage indicator for giving a visual indication of whether a particular voltage is equal to, higher than, or lower than a predetermined normal value.

In practicing my invention a suitable indicator may be provided for indicating generally whether a particular voltage is equal to, greater than, or less than a predetermined normal value. Circuit means may be provided for producing opposite voltages, one of which varies in accordance with variations in the particular voltage of which the indication is desired and the other of which is of predetermined value. By suitably applying the differential of these two voltages to the indicating means, indication may be given of the relative value of the particular voltage of which the indication is desired.

For a more complete understanding of the nature and scope of my invention reference may be had to the following detailed description, taken in connection with the accompanying drawing in which the single figure illustrates an application of one embodiment of the invention for indicating the relative value of the arc voltage in a welding circuit.

Referring to the single figure of the drawing, the reference numeral 10 may denote generally vork on which a welding operation is to be performed, and 12 a welding electrode for maintaining an arc 14 with the work. The work 10 and the welding electrode 12 may be connected to a suitable source of welding current, such, for example, as a source of direct current by means of the conductors 16 and 18 respectively.

In order to indicate whether the welding arc 14 is being maintained at the proper length for producing the best welds, suitable means denoted generally by the reference numeral 20 may be provided for indicating whether the voltage of the arc 14 is equal to, greater than, or less than a predetermined normal value, since the voltage of an arc is, in general, proportional to its length. For example, a suitable indicating device such as a neon glow tube 22 may be provided, having electrode members 24 and 26 positioned therein in spaced relation for individually producing a glow discharge when they are connected to a source of voltage of a sufficiently high value and of the proper polarity.

An auxiliary impulse transformer 30 having a relatively high leakage reactance core 31 may be provided with a primary winding 32, which may be connected to a suitable source of alternating current 33, and a secondary winding 34 for applying relatively high voltage impulses to the electrode members 24 and 26 of the neon glow tube 22. The voltage of the secondary winding 34 should be of such value that it is a predetermined amount less than the minimum voltage required to cause the electrode members of the neon glow tube 22 to produce a glow.

In order to control the operation of the neon glow tube 22 in accordance with the voltage conditions of the arc 14, circuit means may be provided for producing a variable voltage which may be superimposed upon the voltage of the secondary winding 34 so as to selectively cause the electrode members 24 and 26 to produce a glow or remain dark, depending on whether the voltage of the arc 14 is greater than, less than, or equal to a predetermined normal value.

In this instance a variable voltage for thus controlling the operation of the neon glow tube 22 may be produced by a transformer 40, having a primary winding 42 which may be connected to the source of alternating current 33 and a secondary winding 44 which is provided with a center tap 46. Suitable control means may be connected therewith for producing a voltage which varies in response to variations in the voltage of the arc 14 such, for example, as the three-legged reactor 50 having a core 51 with reactor windings 52 on the outer legs thereof and a control winding 54 on the central leg thereof. The reactor windings 52 may be connected in series circuit relation with a suitable impedance 56 across the secondary winding 44, while the control winding 54 may be connected across the arc 14 in series circuit relation with a suitable adjustable control resistor 58. Suitable means such as the rectifiers 60 and 62 may be connected in opposed relation in shunt with the reactor 50 and the impedance 56 and in series circuit relation with suitable resistors 66 and 68 for providing opposing unidirectional voltage impulses. Means such as the condensers 70 and 72 may be connected in series circuit relation with each other and in shunt circuit relation with the resistors 66 and 68 for averaging the unidirectional voltage impulses to provide substantially sustained voltages.

Suitable means such, for example, as a control transformer 75, may be provided for connecting the aforementioned rectifiers, resistors, and condensers to provide a rectifying bridge circuit 76 for producing a differential unidirectional voltage. For example, the primary winding 77 of the control transformer 75 may be connected to the center tap 46 of the secondary winding 44 and to the mid-point 78 between the reactor 50 and the impedance 56. The secondary winding 79 of the control transformer 75 may be connected at one end to the center tap 46 and at the other end to the mid-points 80 and 82 between the resistors 66 and 68 and the condensers 70 and 72, respectively.

By connecting electrode members 24 and 26 of the neon glow tube 22 in series circuit relation with the secondary winding 34 of the impulse transformer 30 and the condensers 70 and 72, these electrode members 24 and 26 may be selectively made to produce a glow depending on whether the arc voltage 14 is too high or too low, and may be made to remain dark when the voltage of the arc 14 is of a correct value.

In operation, the impedance of the reactor 50 varies inversely with respect to variations in the voltage of the arc 14. Since variations of the voltage across the arc 14 vary the direct current flowing in the control winding 50, thus controlling the degree of saturation of the reactor, by adjusting the control resistor 58 the impedance of the reactor 50 may be made equal to that of the impedance 56 when the voltage of the arc 14 is of a predetermined normal value. Under these conditions no current flows in the primary winding of the control transformer 75 so that the voltages across the condensers 70 and 72 are equal and opposite, and the resultant thereof is zero. Since the voltage of the secondary winding 34 of the impulse transformer 30 is itself insufficient to cause the electrode members 24 and 26 to produce a glow, the neon glow tube 22 remains dark, indicating that the voltage of the arc 14 is of the predetermined normal value.

If the voltage of the arc 14 increases above the normal value, the impedance of the reactor 50 is reduced because of increased saturation of the core by the increased flow of direct current in the control winding 54. Under these conditions an alternating current flows through the primary winding 77 of the control transformer 75 and a voltage is impressed on the secondary winding 79. This secondary voltage results in a shifting of the balance in the rectifying bridge circuit 76, so that the voltage across the resistor 66 and the condenser 70 increases while the voltage across the resistor 68 and the condenser 72 decreases. As a result of the shift in the balance of the rectifying bridge circuit 76 a differential voltage results across the condensers 70 and 72 which is superimposed on the secondary voltage of the impulse transformer 30. This differential voltage is of such a value and polarity that the voltage impressed on the electrode member 24 becomes sufficient to cause the electrode member 24 of the tube to produce a glow, indicating that the voltage of the arc 14 is higher than the desired normal value.

Should the voltage of the arc 14 drop below the desired normal value the impedance of the reactor 50 increases so that current flows through the primary winding 77 of the control transformer in the opposite direction. The balance of the rectifying bridge circuit is then shifted in the opposite direction so that the differential voltage across the condensers 70 and 72 is of the reversed polarity, and when superimposed on the voltage of the secondary winding 34 causes the electrode member 26 of the tube to produce a glow, indicating that the voltage of the arc 14 is too low.

From the above description taken in connection with the accompanying drawing, it will be apparent that I have in my invention provided in a simple and effective manner for indicating the relative voltage conditions between any particular points in a circuit. Such an indicating system involves no moving parts and no complicated or expensive tubes, relays, or the like, so that the setting thereof is not readily affected and maintenance is reduced to a minimum.

Since certain changes may be made in the above description, and different embodiments in the invention may be made without departing from the spirit thereof, it is intended that all the matter contained in the above description or shown in the accompanying drawing shall be shown as illustrative and not in a limiting sense.

I claim as my invention:

1. An indicator comprising, a discharge lamp having a pair of electrodes, circuit means for applying an alternating current voltage to the electrodes of a value insufficient to produce a glow discharge at either of the electrodes, and means connected to the circuit means for superimposing on the alternating current voltage a reversible direct control voltage of a value sufficient to selectively produce glow discharges at the electrodes.

2. A voltage indicator for a voltage having a predetermined normal value comprising, discharge lamp indicating means connected to a source of relatively high alternating current voltage of a predetermined value less than the operating voltage therefor, and means including an alternating-current bridge circuit and rectifying means connected to the said source for superimposing on said relatively high voltage a relatively low reversible direct-current control voltage responsive to variations in the voltage of which an indication is desired to produce voltage impulses of a sufficient value for effecting operation of the indicating means to indicate any departure from normal of the said voltage.

3. The combination in a voltage indicator system, of a glow tube with a pair of electrodes connected to the opposite terminals of a source of alternating current having a relatively high voltage which is a predetermined amount less than the breakdown voltage required to cause the electrodes of the tube to glow, and circuit means for applying a direct-current control voltage to the electrodes of the glow tube in response to changes in either direction from a normal value of the voltage of which an indication is desired to selectively cause the electrodes of the glow tube to glow and indicate the direction of change of the said voltage from a normal value.

4. A voltage indicator comprising, an alternating-current bridge circuit including fixed and variable impedances connected to a source of alternating current and a bridging transformer having a primary winding connected in bridged relation therebetween and a secondary winding, a glow tube having a pair of electrode members connected to an alternating-current source of voltage a predetermined amount less than the voltage required to produce a glow at the electrode members, circuit means including a pair of oppositely disposed rectifier devices and control resistors connected in shunt relation with the said impedances and in series circuit relation with the electrode members and source of voltage, circuit means connecting the secondary winding of the bridging transformer in bridged relation between the control resistors and the first-mentioned source of alternating current to produce a reversible direct-current differential voltage across the control resistors sufficient to produce glow discharges at the electrode members, and means controlling the impedance of the variable impedance to selectively control the glowing of the electrode members.

5. An indicating system comprising, a bridge circuit having fixed and variable impedance means connected to an alternating-current source and a transformer having a primary winding connected in bridging relation therewith and a secondary winding, a glow tube having a pair of electrode members connected to the terminals of a relatively high voltage source of alternating-current voltage a predetermined amount less than the value effective to produce a glow discharge at the electrode members, circuit means including a pair of rectifiers so connected to the bridge circuit and secondary winding as to apply to the electrode members a reversible direct-current voltage of sufficient value to selectively effect a glow discharge at the said electrode members, and means for controlling the variable impedance in accordance with departures from a predetermined normal condition to control the said glow discharge.

6. An indicator system comprising, a glow tube having a pair of electrode members connected to the opposite terminals of a source of alternating-current bias voltage a predetermined amount less than the minimum voltage at which the electrode members produce glow discharges, circuit means connected to the said source for applying thereto a reversible direct-current voltage sufficient to produce glow discharges at the electrode members, and means controlling said circuit means to selectively determine the polarity of the direct-current voltage.

FINN H. GULLIKSEN.